Patented Aug. 22, 1944

2,356,317

UNITED STATES PATENT OFFICE 2,356,317

GLASS ENAMEL COMPOSITION

Carl J. Harbert, Shaker Heights, and Robert F. Morrison, Elyria, Ohio, assignors to The Harshaw Chemical Company, Elyria, Ohio, a corporation of Ohio No Drawing. Application July 22, 1943, Serial No. 495,958

9 Claims. (Cl. 106—49)

This invention relates to low fusing enamels of superior alkali resistance suitable for application to glass, and to glass articles having such enamels applied thereon.

We have discovered that by making use of barium stannate ($BaSnO_3$) as a melted in smelter addition in the smelting of the frit, we are able to produce glass enamels of improved alkali resistance.

The enamel compositions of the invention are essentially low fusing (not above 640° C.) lead borosilicate glazes containing when desired special additions for special functions and all containing barium stannate for alkali resistance. We prefer to employ barium stannate in proportion from about 6 per cent to 14 per cent by weight of the finished glaze exclusive of pigment. Suitable composition ranges, on the analytical basis, are as follows: Lead oxide 40 to 60 parts by weight, silica 22 to 32 parts by weight, boric oxide 3 to 12 parts by weight, titania 0 to 5 parts by weight, preferably 2 to 4 parts by weight, soda 3 to 7, preferably about 5 parts by weight, sodium fluoride ½ to 2 parts by weight, cadmium oxide 0 to 5 parts by weight, and barium stannate 6 to 14, preferably 10 to 12 parts by weight. Sodium fluoride can be omitted but it is highly desirable for improving fusibility. Other fluorides can be used, such as potassium fluoride, lead fluoride or barium fluoride. Proportions should be such that the fluorine content is about equivalent to ½ to 2 parts by weight of sodium fluoride, that is, from about one-fifth of one per cent to about one per cent of fluorine based on the weight of the enamel not including pigment. Percentages and proportions are by weight exclusive of the weight of pigment.

By referring to composition ranges on the analytical basis, we intend to indicate that the constituent materials will be found on analysis in those proportions, but we do not intend to indicate the kind of physical or chemical association which may exist in the glaze itself.

The following example will serve to illustrate the invention:

| Material | Smelter batch A, parts by weight |
|---|---|
| Sodium silicate | 9.11 |
| Sodium titanium silicate | 6.50 |
| Lead monosilicate | 36.0 |
| Cadmium oxide | 3.0 |
| Lead borate | 25.5 |
| Silica | 13.0 |
| Barium stannate | 12.0 |
| Sodium fluoride | 1.0 |
| Total | 106.11 |

| Material | Frit from batch A |
|---|---|
| $Na_2O$ | 4.37 |
| $SiO_2$ | 25.60 |
| $TiO_2$ | 1.91 |
| $PbO$ | 47.00 |
| $CdO$ | 2.37 |
| $B_2O_3$ | 5.60 |
| $BaSnO_3$ | 11.55 |
| $F$ | 0.23 |
| Total | 98.63 |

This example is merely representative of many compositions possible according to the invention. Lead borosilicate is the fundamental basis of the enamel and it may contain various proportions of the oxides of lead, sodium, boron and silicon according to desired maturing temperature, coefficient of expansion, etc., all of which is understood by persons skilled in the art. Titania functions to improve acid resistance and the amount is not critical. If acid resistance is not essential, titania can be omitted. Cadmium oxide is present in this example to condition the frit for use of a cadmium color to be introduced as a mill addition.

The ingredients of the batch are smelted sufficiently to produce a clear melt which is then fritted in the usual manner and is ready to be ground with suitable mill additions in the preparations of the enamel. The most important mill additions are, of course, pigments either white or colored. Normally we make up the batch such as indicated in the example, melt it to a clear melt, frit it into water and then grid the frit with the pigment and other usual mill additions. The resulting enamel is applied to glass in the usual way. It is posisble, of course, to add some pigments in the batch, that is, as smelter additions, but we prefer to add them at the mill. The pigment selected should be such that when the enamel is applied to glass and fused on the pigment particles do not melt. Thus the enamel consists of pigment particles dispersed in a melted glaze matrix of the compositions indicated above.

Having thus described our invention, what we claim is:

1. A lead borosilicate glaze suitable for decorating glassware, having a fusing temperature not higher than 640° C. and exhibiting superior alkali resistance, said glaze comprising a pigment dispersed in a glaze matrix of lead borosilicate type and said matrix containing as smelted in addition for imparting high alkali resistance barium stannate in proportion from 6% to 14% of the matrix by weight.

2. A glass article having at least a portion of its surface coated with the glass defined in claim 1.

3. A lead borosilicate glaze of low melting point suitable for decorating glassware and exhibiting high resistance to alkalies, said glaze comprising a pigment dispersed in a melted matrix, said matrix containing, on the analytical basis, the oxides of lead, silicon, sodium and boron and also fluorine from 0.2% to 1.0% and barium stannate from 6% to 14% of the matrix by weight.

4. A lead borosilicate glaze of low melting point suitable for decorating glassware and exhibiting high resistance to alkalies, said glaze comprising a pigment dispersed in a melted matrix, said matrix containing, on the analytical basis, the oxides of lead, silicon, sodium and boron and also fluorine from 0.2% to 1.0% and barium stannate from 10% to 12% of the matrix by weight.

5. A lead borosilicate glaze of low melting point suitable for application to glass and comprising a pigment and a melted glaze matrix, said matrix being on the analytical basis composed of the following in approximately the proportions indicated:

| | Parts by weight |
|---|---|
| PbO | 40 to 60 |
| $Na_2O$ | 3 to 7 |
| $SiO_2$ | 22 to 32 |
| $B_2O_3$ | 3 to 12 |
| $TiO_2$ | 0 to 5 |
| Fluorine | 0.2 to 1.0 |
| Barium stannate | 6 to 14 |

6. A glass article having at least a portion of its surface coated with the glaze defined in claim 5.

7. A lead borosilicate glaze of low melting point suitable for application to glass and comprising a pigment and a melted glaze matrix, said matrix being on the analytical basis composed of the following in approximately the proportions indicated:

| | Parts by weight |
|---|---|
| PbO | 40 to 60 |
| $Na_2O$ | 3 to 7 |
| $SiO_2$ | 22 to 32 |
| $B_2O_3$ | 3 to 12 |
| $TiO_2$ | 2 to 4 |
| Fluorine | 0.2 to 1.0 |
| Barium stannate | 10 to 12 |

8. A glass article having at least a portion of its surface coated with the glaze defined in claim 7.

9. A method of making a glaze composition which includes the step of smelting together to produce a clear melt, a batch containing barium stannate and materials capable of yielding:

| | Parts by weight |
|---|---|
| PbO | 40 to 60 |
| $Na_2O$ | 3 to 7 |
| $SiO_2$ | 22 to 32 |
| $B_2O_3$ | 3 to 12 |
| Fluorine | 0.2 to 1.0 | barium stanate amounting to from 6 to 14 per cent by weight of the resulting melt.

CARL J. HARBERT.
ROBERT F. MORRISON.